United States Patent [19]

Holloway et al.

[11] Patent Number: 4,964,678
[45] Date of Patent: Oct. 23, 1990

[54] UNIVERSAL ANTI-LOCK BRAKE SWITCH LINKAGE

[75] Inventors: John C. Holloway, Cumberland, R.I.; James A. Mallett, Milton, Mass.

[73] Assignee: Joseph Pollak Corporation, Boston, Mass.

[21] Appl. No.: 378,327

[22] Filed: Jul. 11, 1989

[51] Int. Cl.⁵ .............................................. B60T 11/18
[52] U.S. Cl. .................................... 303/91; 200/61.89; 303/101
[58] Field of Search .......... 74/541; 188/196 B, 196 P; 200/61.89; 303/91, 92, 100, 101

[56] References Cited

U.S. PATENT DOCUMENTS

| | | | |
|---|---|---|---|
| 2,522,181 | 9/1950 | Krikorian | 188/196 B |
| 4,316,065 | 2/1982 | Rupp et al. | 200/61.89 |
| 4,658,939 | 4/1987 | Kircher et al. | 303/101 X |

FOREIGN PATENT DOCUMENTS

| | | | |
|---|---|---|---|
| 0155046 | 7/1986 | Japan | 303/101 |
| 937781 | 9/1963 | United Kingdom | 188/196 P |

*Primary Examiner*—Duane A. Reger
*Attorney, Agent, or Firm*—Kenway & Crowley

[57] ABSTRACT

An anti-lock braking system which is adaptable to installation in a wide range of vehicles by means of a self-adjusting connecting linkage between the brake and the control system for anti-lock braking. The brake pedal is linked to the control system by a latched member which releases to permit the linkage to assume the appropriate length for the particular vehicle. The linkage includes frictionally engaged elements which move relative to each other as required and the braking system includes a hydraulic circuit which prevents depletion of hydraulic fluid.

7 Claims, 2 Drawing Sheets

UNIVERSAL ANTI-LOCK BRAKE SWITCH LINKAGE

This invention relates in general to anti-lock brake systems (ABS) and in particular to a highly reliable and universally adaptable installation mechanism for such systems.

BACKGROUND OF THE INVENTION

The value of anti-lock braking has been recognized for a number of years, and systems providing that function have been developed and operated successfully, especially in the more sophisticated and expensive lines of vehicles. Their use is widespread enough for them to be known by the acronym "ABS", but despite their proven merit as safety devices, they are not yet in general use. Part of the reason for this situation is the cost of fabrication and installation. Also, of course, reliability of the ABS must be of a high order in an accessory involved in the vital action of vehicular braking, which means that components tend to be relatively expensive.

Almost all anti-lock brake systems, particularly those for automotive use, are involved with hydraulic brakes. Basic hydraulic brakes include reservoir of brake fluid which connects to or forms a part of a master cylinder in which a piston is reciprocally movable by means of a foot pedal. The master cylinder is connected by hydraulic fluid tubes to a slave cylinder at each wheel of the vehicle. Each slave cylinder also has a reciprocally movable piston mechanically connected to move a brake shoe against a drum or a brake caliper against a disk.

Skidding takes place when the vehicle operator presses the pedal which applies the brakes and a wheel or wheels become locked against rotation and slide uncontrollably on a slippery surface. Anti-lock brake systems (ABS) are designed to sense such locking and quickly and momentarily release the locked wheel. A lock-and-release cycle should then take place rapidly and repetitively, permitting very short pulses of angular wheel rotation. Thus, skidding episodes are disrupted as the wheel resumes rotating rather than locking and sliding.

Typically, a sensor detects decelerating rotation or a locked wheel and triggers an ABS electronic control module which shifts the appropriate ABS valve to discontinue further fluid transfer to the wheel cylinder. Also, the ABS valve is switched to tap off hydraulic fluid from the wheel cylinders. Fluid that is so tapped off is collected in an auxiliary ABS reservoir. The wheel cylinder being thus depressurized, the brake releases and the wheel can again rotate. To keep the whole system continuously operative, enough fluid must be returned to the master cylinder reservoir to prevent it becoming fully depleted. This function is served by a pump timed in operation by the ABS control in conjunction with the tapping off of fluid from the wheel cylinders To that end, a linkage including a reciprocal plunger is employed between the vehicle's brake pedal and a switch which is also connected to the ABS control along with the rotation sensor. A balance must be achieved between operator foot pressure applied to the brake pedal and back pressure applied in opposition by the master cylinder piston being moved in response to fluid coming from the pump During an ABS stop, the pedal actually dithers about the point in its travel at which switching occurs.

Different vehicular specifications and even normal manufacturing tolerances demand that the linkage between the pedal and the ABS switch be adjustable in length to accommodate differing amounts of pedal travel. Adjustment must also permit the matching of the pedal free (retracted) position with limit of extension of the plunger from the switch body. Limiting of the pedal excursion by the ABS switch itself is to be avoided. It is with practical solutions of these problems that the present invention is concerned and has for its primary objects.

Another object is making possible more general use of ABS braking systems through reduction of cost of parts, fabrication and installation.

A further object is the simplification of installation and the prevention of faulty installation of ABS braking in vehicles.

For a better understanding of these and other objects, features, and advantages of the present invention, reference should be made to the following description of a preferred embodiment which should be read in conjunction with the appended drawing in which:

DESCRIPTION OF PREFERRED EMBODIMENTS

Figure 1:
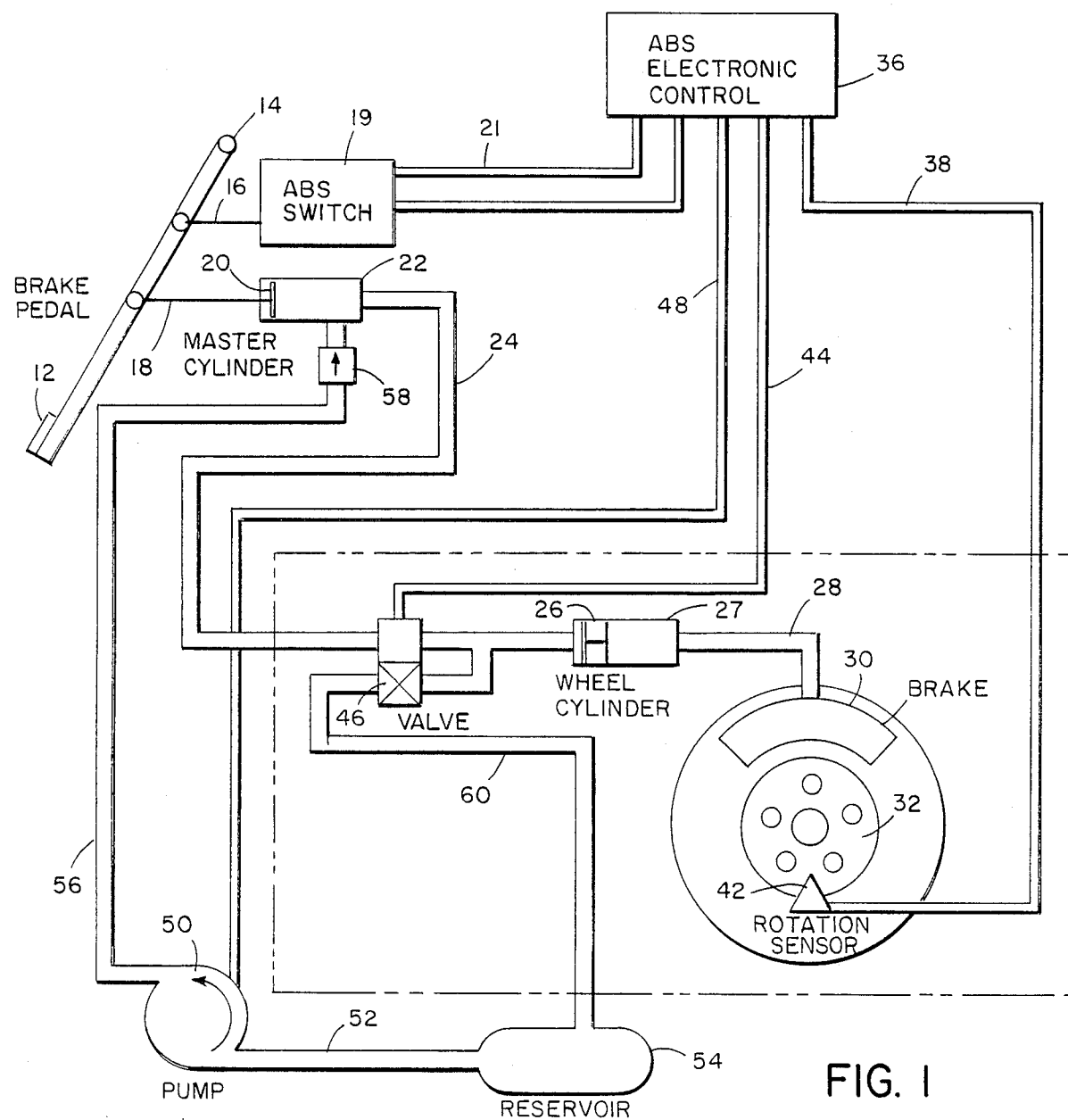
FIG. 1 is a schematic illustration of the basic elements of the ABS braking equipment of the invention.

FIG. 1 illustrates schematically a vehicular braking system in the rest condition. The brake pedal 12 is at its furthest excursion clockwise under spring pressure and no counter pressure is being applied to the brake pedal 12 by the operator of the vehicle. The pedal 12 pivots freely about a point 14 fixed to the frame of the vehicle and two pivoted arms 16 and 18 extend outwardly from pins disposed along the length of the brake pedal.

The ratio of the lengths of the arms 16 and 18 is chosen to provide the operative action described below. The upper arm 16 is connected to an anti-locking brake (ABS) switch 19. The lower arm 18 is linked, usually through accessory equipment, to a piston 20 in a master cylinder 22. A conventional hydraulic line 24 extends from the master cylinder to a wheel cylinder 26. In practice, of course, there would be multiple hydraulic circuits each being associated with a particular wheel of the vehicle, as suggested by the dashed line enclosure. From the opposite end of each wheel cylinder a mechanical linkage 28 extends to a caliper 30. Movement of the piston 20 causes the caliper 30 to be applied to a disc 32 of a vehicle wheel.

With the exception of the arm 16 and the ABS switch 19, everything which has been described to this point is conventional in regular hydraulic braking systems. For the anti-locking purposes of this invention, however, there are additional elements in the system including an electronic control module 36 to which the brake switch 19 is electrically connected by wiring 21. Other electrical wiring 38 runs between the control member 36 and a rotation sensor 42 mounted adjacent a normally rotating component of the vehicle wheel assembly. Also connected to the control 36 is further wiring 44 which extends to an actuator such as a solenoid which shifts the ABS control valve 46 in a manner explained in greater detail below. Further electrical wiring 48 extends from the control 36 to an actuator for a pump 50. The pump 50 has a fluid input line 52 from an ABS reservoir 54. An output line 56 extends from the pump 50 through a one-way valve 58 thence back a point between the ABS valve and to the master cylinder 22. This auxiliary hydraulic circuit is completed by a hydraulic line 60 which extends from the line 24 through the valve 46 and conveys fluid to the reservoir 54.

Understanding of the invention is facilitated by first considering normal braking operation. In those circumstances, operator pressure applied to the brake pedal 12 causes the movement of the piston 20 and the flow of brake fluid from the master cylinder 22 through the line 24 to the wheel cylinders of which cylinder 27 is typical. At the wheel cylinder, the piston 26 is caused to move by hydraulic pressure forcing the caliper 30 into contact with the disc 32.

Anti-lock braking, referred to here as an ABS stop, is initiated when operator pressure is applied to the pedal 12 and a rotation sensor 42 detects that rotation of a wheel is decelerating rapidly or has completely ceased. At this time, a "locked-wheel" signal is generated and passed along the line 38 to the electronic control 36. The electronic control in response to the received signal triggers the ABS valve 46 via the wiring 44, cutting off further flow of brake fluid from the master cylinder 22 to the wheel cylinder 27 and also permitting fluid from the wheel cylinder 27 to pass through the line 60 to the reservoir 54. The resulting depressurization of the wheel cylinder 27 permits the brake to release and the wheel to resume normal rotation. The sensor 42 detects resumed normal rotation and passes a signal to the control 36 which then shifts the valve 46 back to its original position, permitting braking to resume. The lock-unlock cycle is repeated at a very rapid rate independently for each wheel until operating force is no longer being applied to the brake pedal 12; until no locking condition is detected by any of the rotation sensors; or until the vehicle itself comes to a stop.

During this operation, fluid is removed from the primary hydraulic circuit which includes the master cylinder and wheel cylinders. Should such removal continue uninterrupted, the master cylinder would become void of brake fluid and all braking power would be lost. To prevent this eventuality, the pump 50 comes into play to refill the hydraulic circuit between the ABS valve and the master cylinder 22.

Triggering of the pump occurs when the travel of the pedal 12 and its associated piston in the master cylinder 22 becomes excessive. This measurement or determination is made indirectly by the ABS switch 19 which monitors pedal travel measured by the plunger shaft 16. At a predetermined point in the downward travel of the pedal, the plunger shaft causes switch contacts in the ABS switch 19 to transfer and provide a signal to the control module 36 to initiate pumping. With the return of fluid to the master cylinder 22, the piston 20 is displaced in opposition to force being applied to the pedal by the operator of the vehicle. This force causes the pedal to rise and the plunger 16 to reset the switch 19.

Figure 2:
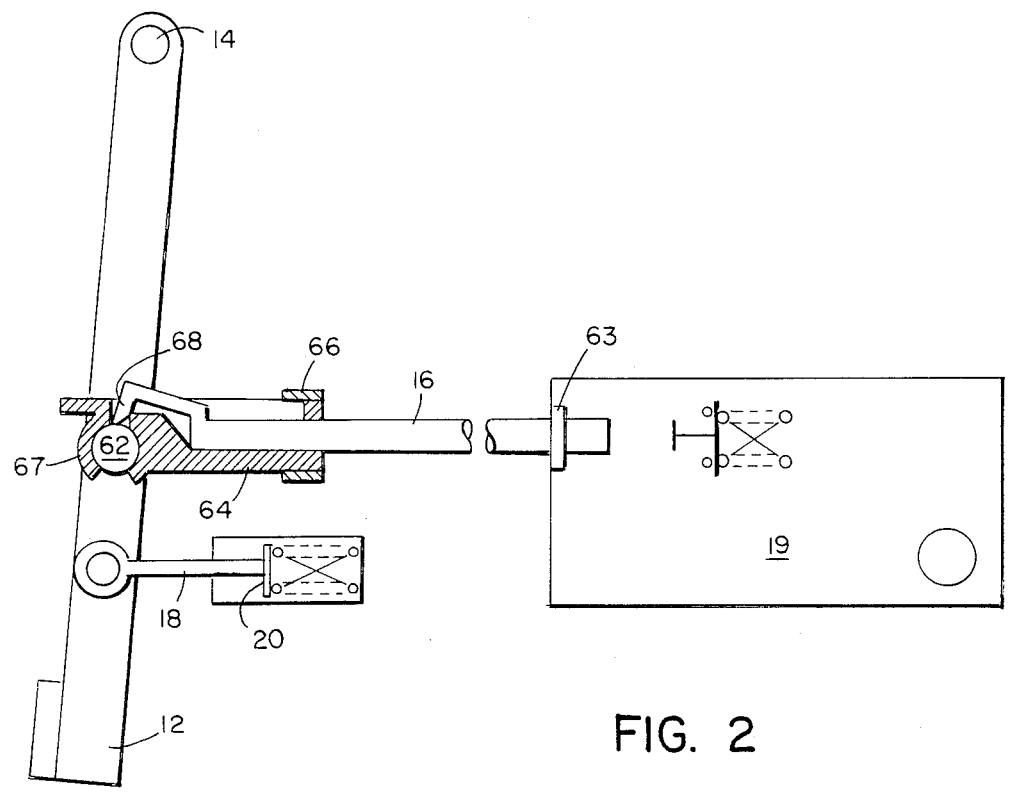
FIG. 2 is an enlarged view of key components of the connecting linkage of the vehicular pedal and ABS switch in one position.

FIG. 2 illustrates a portion of the ABS system as it appears before final adjustment. Normal manufacturing tolerances are such that the free position of the pedal 12 can vary greatly and proper operation of the ABS system requires that the plunger 16 be at its full extension outward from the switch 19 when the pedal 12 is in that free position. To assure that such matching of positions is possible with the pedal 12 fully pivoted clockwise and the plunger 16 fully extended, the linkage which includes the plunger 16 is made self-adjustable in length.

Clockwise pivoting of the pedal is actually limited by the arm 18 being fully extended to the point where the piston 20 contacts the inner wall of the master cylinder 22. The free position of the pedal 12 is thus determined. Between the main pivot 14 and the point of attachment of the master cylinder plunger arm 18 there is a pin 62 fixed to the pedal 12. The self-adjusting connecting link connects the pin 62 and the arm 16 as shown and it includes a split sleeve 64 one end of which surrounds the shaft of the plunger 16. The split sleeve is enclosed by a ring clamp 66 and terminates in a hook 67. The plunger 16 terminates in a latching finger 68 which penetrates a radial opening formed through the bearing surface of the hook 67.

The plunger 16 is designed to reciprocate freely horizontally as shown in the switch body 19, its outward travel being limited by the collar 63 which also prevents its complete detachment from the switch body 19 The clamp 66 squeezes the split sleeve 64 tightly against the periphery of the plunger and holds it relatively firmly fixed in position on the plunger 16. Axial movement of the plunger 16 in the switch body 19 is substantially friction-free as noted, whereas similar movement of the plunger 16 in the clamped split sleeve 64 is deliberately rendered very difficult. That is, the friction between the split sleeve and the plunger shaft is considerably greater than that between the switch body 19 and the plunger shaft 16.

Figure 3:
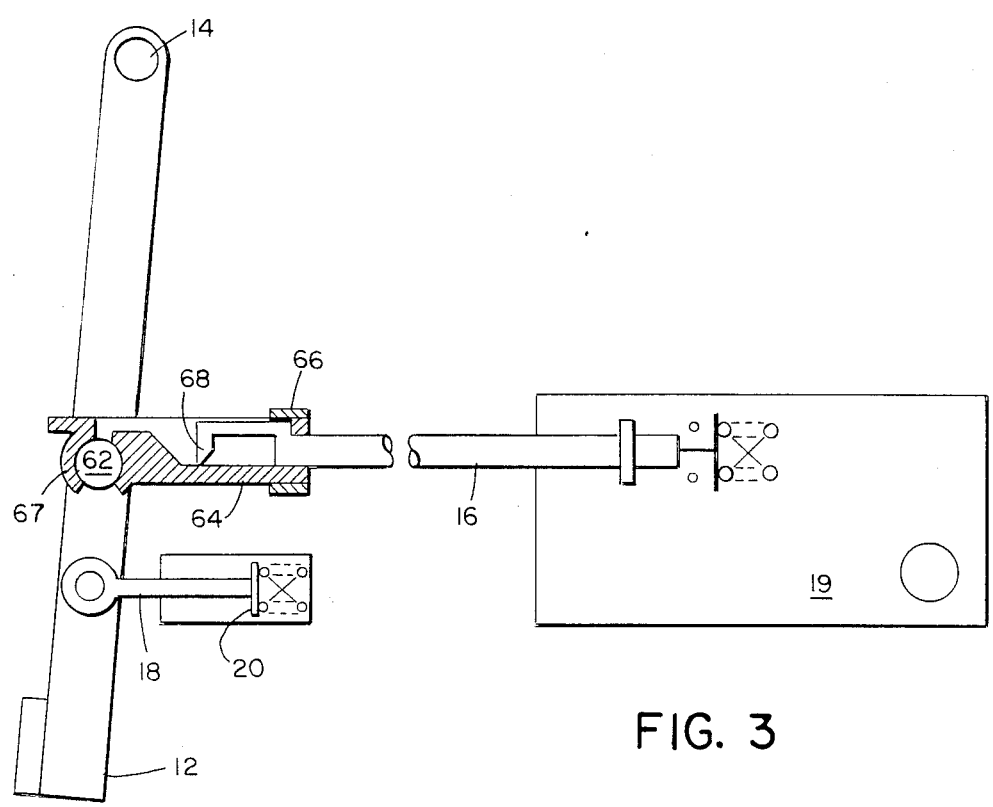
FIG. 3 is a similar view to FIG. 2 of the linkage in a second position.

To set up the ABS system at installation, the pedal 12 may be depressed (moved in a counterclockwise direction) until the hook 67 can be snapped over the pin 62 as shown in FIG. 2. This causes the latching finger 68 to be lifted from the radial opening in the hook 67. Both the hook 67 and the plunger arm 16 are made of relatively flexible material which may be bent to permit those items to be engaged and disengaged as shown. The pedal 12 may now be pulled back in a clockwise direction and before it reaches its limit, the linkage self-adjusts. Consideration of FIG. 3 will aid in understanding the operation.

When the latching finger 68 is raised by the pin 62, its sloped end is in contact with the bearing wall of the hook 67. Pulling the pedal 12 clockwise brings the hook 67 and the split sleeve 64 with it, the finger 68 slipping out of the opening in the hook 67. The plunger 16 can travel only the distance allowed by the stop 63 and the split sleeve then moves leftward relative to the plunger 16.

When the pedal 12 reaches its maximum clockwise position, the plunger 16 has remained in the position determined by the stop 63. Thus, irrespective of variations and tolerances in pedal position and mounting, pedal free position and final plunger switch position are matched. This adjustment is final and is maintained without further change.

Accidental or intentional maladjustment is defeated by this system. The linkage cannot be overextended because the hook and split sleeve cannot be pulled to the end of the plunger, the available adjusting distance being chosen to be greater than maximum pedal travel.

In operation, when the brake is depressed, hydraulic fluid flows from the master cylinder to the wheel cylinders to initiate braking. The ABS switch has changed state, but no ABS action occurs unless a locked wheel signal is received from one or more of the rotation sensors. If that occurs, the ABS valve stops further flow of fluid to the wheel cylinder and opens to depressurize that wheel cylinder and release the brake. Upon release of the brake, the wheel resumes rotation, the sensor signals the control module and the original conditions are restored.

The dumping of brake fluid into the reservoir during the ABS stop requires remedial action to return fluid to the master cylinder and this is accomplished by the pump which is triggered into action when excess piston travel in the master cylinder is indicated by measured excess pedal travel The pumped fluid causes the pedal to rise slightly opposing and exceeding operator-applied force on the pedal. With the pedal rise the ABS switch resets, signalling the control module to stop the pump. If ABS action is continuing, the pedal will be depressed again until switch contacts reverse and the entire process is repeated.

What is claimed is:

1. In a vehicle having rotatable wheels, a braking system for said wheels including a brake pedal mounted for travel of a given length, a connecting linkage, a switch operable to change states as said brake pedal reaches a predetermined point in said travel, a pin fixed to said brake pedal, said connecting linkage being variable in length and having one end thereof operatively connected to said switch and an opposite end engageable by said pin, and a latch normally preventing said linkage from changing in length, said latch being displaceable to permit said linkage to change in length upon engagement of said pin by said opposite end of said linkage.

2. In a vehicle as defined in claim 1, the combination wherein said braking system includes hydraulic circuits for applying braking pressure to said wheels, an electronic control, a sensor of rotation of said wheels connected to said electronic control, and means for periodically changing said pressure in said hydraulic circuits in response to triggering of said electronic control by said sensor of rotation of said wheels.

3. In a vehicle as defined in claim 2, the combination wherein said hydraulic circuits include at least a master cylinder having a piston connected to said brake pedal, a reservoir of fluid, and a pump responsive to said electronic control for replenishing fluid in said hydraulic circuit which includes said master cylinder from said reservoir in response to travel of said brake pedal in excess of a predetermined amount.

4. In a vehicle as defined in claim 1, the combination wherein said connecting linkage includes a movable plunger at said one end thereof for causing said switch to change states, a hook frictionally engaging said plunger to a given degree and having a radially apertured bearing surface at said opposite end, said latch normally penetrating said apertured bearing surface, engagement of said hook by said pin forcing said latch radially out of said hook and permitting said plunger to move relative to said hook to adjust the length of said linkage.

5. In apparatus as defined in claim 4, the further combination wherein said hook includes a split sleeve surrounding said plunger and a clamp surrounding said split sleeve to provide said frictional engagement to a given degree therebetween.

6. In apparatus as defined in claim 5, the combination wherein said switch is disposed in an enclosure in which said plunger is reciprocally movable, a first stop being provided on said plunger to limit its movement out of said enclosure.

7. In apparatus as defined in claim 6, the combination which includes a second stop connected to said brake pedal and limiting the travel thereof in a direction away from said switch whereby the length of said connecting linkage may be adjusted to set said predetermined point at which said switch changes states.

* * * * *